US012499976B2

(12) United States Patent
Trim et al.

(10) Patent No.: US 12,499,976 B2
(45) Date of Patent: Dec. 16, 2025

(54) NETWORK USER DATA DELIVERY

(71) Applicant: INTERNATIONAL BUSINESS MACHINES CORPORATION, Armonk, NY (US)

(72) Inventors: Craig M. Trim, Ventura, CA (US); Faried Abrahams, Laytonsville, MD (US); Gandhi Sivakumar, Bentleigh (AU); Kushal S. Patel, Pune (IN); Sarvesh S. Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 870 days.

(21) Appl. No.: 17/462,931

(22) Filed: Aug. 31, 2021

(65) Prior Publication Data

US 2023/0074003 A1 Mar. 9, 2023

(51) Int. Cl.
*G16H 10/60* (2018.01)
*G16H 50/30* (2018.01)
*G16H 50/80* (2018.01)

(52) U.S. Cl.
CPC ............. *G16H 10/60* (2018.01); *G16H 50/30* (2018.01); *G16H 50/80* (2018.01)

(58) Field of Classification Search
None
See application file for complete search history.

(56) References Cited

U.S. PATENT DOCUMENTS 8,019,633 B2 9/2011 Stroman et al.
8,645,165 B2 2/2014 Belcher et al.
(Continued)

FOREIGN PATENT DOCUMENTS

CA 2692063 C 12/2016

OTHER PUBLICATIONS

Ndeffo Mbah ML, Gilligan CA. Resource allocation for epidemic control in metapopulations. PLoS One. 2011;6(9):e24577. doi: 10.1371/journal.pone.0024577. Epub Sep. 13, 2011. PMID: 21931762; PMCID: PMC3172228. (Year: 2011).*
Khan, et al.. (2019). A Survey on Security and Privacy of 5G Technologies: Potential Solutions, Recent Advancements and Future Directions. IEEE Communications Surveys & Tutorials. 10.1109/COMST.2019.2933899. (Year: 2019).*
Anonymous, "Method and Apparatus for Transport Regulation with 5G-VNF for Assured Infection-Free Commute", IPCOM000264996D: Feb. 16, 2021, 7 pgs.
(Continued)

*Primary Examiner* — Devin C Hein
(74) *Attorney, Agent, or Firm* — Michael A. Petrocelli, Esq.; Heslin Rothenberg Farley & Mesiti P.C.; George S. Blasiak, Esq.

(57) ABSTRACT

Methods, computer program products, and systems are presented. The method computer program products, and systems can include, for instance: obtaining medical health user data from respective ones of a plurality of UE devices by a virtual network function (VNF) layer which VNF layer has assigned logical channels to respective ones of the UE devices for wireless transmission of the user data, wherein the VNF layer maintains user to logical channel association data associating user identifying data to logical channels assigned to users identified by the user identifying data; examining, by a service orchestration layer that runs on top of the VNF layer, medical health data of the user medical health data, wherein the service orchestration layer is configured so that the service orchestration layer is restricted from accessing the user identifying data of the user to logical channel association data; and performing processing in dependence on the examining.

20 Claims, 11 Drawing Sheets

(56) References Cited

U.S. PATENT DOCUMENTS

| | | |
|---|---|---|
| 11,342,051 B1* | 5/2022 | Jain ................... G16H 10/60 |
| 2005/0149358 A1 | 7/2005 | Sacco et al. |
| 2020/0294680 A1 | 9/2020 | Gupta et al. |
| 2020/0380178 A1 | 12/2020 | Santarone et al. |
| 2020/0387537 A1* | 12/2020 | Trim ................... G06F 3/005 |
| 2021/0050116 A1 | 2/2021 | Sabeti et al. |

OTHER PUBLICATIONS

Mell, Peter, et al., "The NIST Definition of Cloud Computing", NIST Special Publication 800-145, Sep. 2011, Gaithersburg, MD, 7 pgs.

Gunnarsson, F., et al., "LTE Positioning and RTK: Precision down to the centimeter", The Ericsson Blog, Nov. 19, 2018, retrieved on Aug. 31, 2021 from Internet URL: https://www.ericsson.com/en/blog/2018/11/lte-positioning-and-rtk-precision-down-to-the-centimeter, 8 pgs.

Cameron, A., "5G, cellular's next step, brings new positioning capabilities", Feb. 21, 2018, retrieved on Aug. 31, 2021 from Internet URL: https://www.gpsworld.com/5g-cellulars-next-step-brings-new-positioning-capabilities/, 10 pgs.

\* cited by examiner

MEDICAL LOGISTICS DESTINATION (PHARMACY, HOSPITALS, ETC) IN AN ENODEB

INTENSITY ZONE DETECTION

INTENSITY ZONE AND REGION SELECTION

NETWORK USER DATA DELIVERY

BACKGROUND

Embodiments herein relate generally to computer networks and particularly to network user data delivery.

A network service can include an application running at the network application layer and above that provides data storage, manipulation, presentation, communication or other capability which is often implemented using a client-server architecture based on application layer network protocols. Each network service is usually provided by a server component running on one or more computer and accessed via a network by client components running on other devices. However, client and server components may both run on the same machine. In addition, a dedicated server computer may offer multiple network services concurrently.

Location based services (LBS) are software services that use location data to control functionality of computer systems LBS information services have a number of uses, e.g., in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: obtaining medical health user data from respective ones of a plurality of UE devices by a virtual network function (VNF) layer which VNF layer has assigned logical channels to respective ones of the UE devices for wireless transmission of the user data, wherein the VNF layer maintains user to logical channel association data associating user identifying data to logical channels assigned to users identified by the user identifying data; examining, by a service orchestration layer that runs on top of the VNF layer, medical health data of the user medical health data, wherein the service orchestration layer is configured so that the service orchestration layer is restricted from accessing the user identifying data of the user to logical channel association data; and performing processing in dependence on the examining.

In another aspect, a computer program product can be provided. The computer program product can include a computer readable storage medium readable by one or more processing circuit and storing instructions for execution by one or more processor for performing a method. The method can include, for example: obtaining medical health user data from respective ones of a plurality of UE devices by a virtual network function (VNF) layer which VNF layer has assigned logical channels to respective ones of the UE devices for wireless transmission of the user data, wherein the VNF layer maintains user to logical channel association data associating user identifying data to logical channels assigned to users identified by the user identifying data; examining, by a service orchestration layer that runs on top of the VNF layer, medical health data of the user medical health data, wherein the service orchestration layer is configured so that the service orchestration layer is restricted from accessing the user identifying data of the user to logical channel association data; and performing processing in dependence on the examining.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining medical health user data from respective ones of a plurality of UE devices by a virtual network function (VNF) layer which VNF layer has assigned logical channels to respective ones of the UE devices for wireless transmission of the user data, wherein the VNF layer maintains user to logical channel association data associating user identifying data to logical channels assigned to users identified by the user identifying data; examining, by a service orchestration layer that runs on top of the VNF layer, medical health data of the user medical health data, wherein the service orchestration layer is configured so that the service orchestration layer is restricted from accessing the user identifying data of the user to logical channel association data; and performing processing in dependence on the examining.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
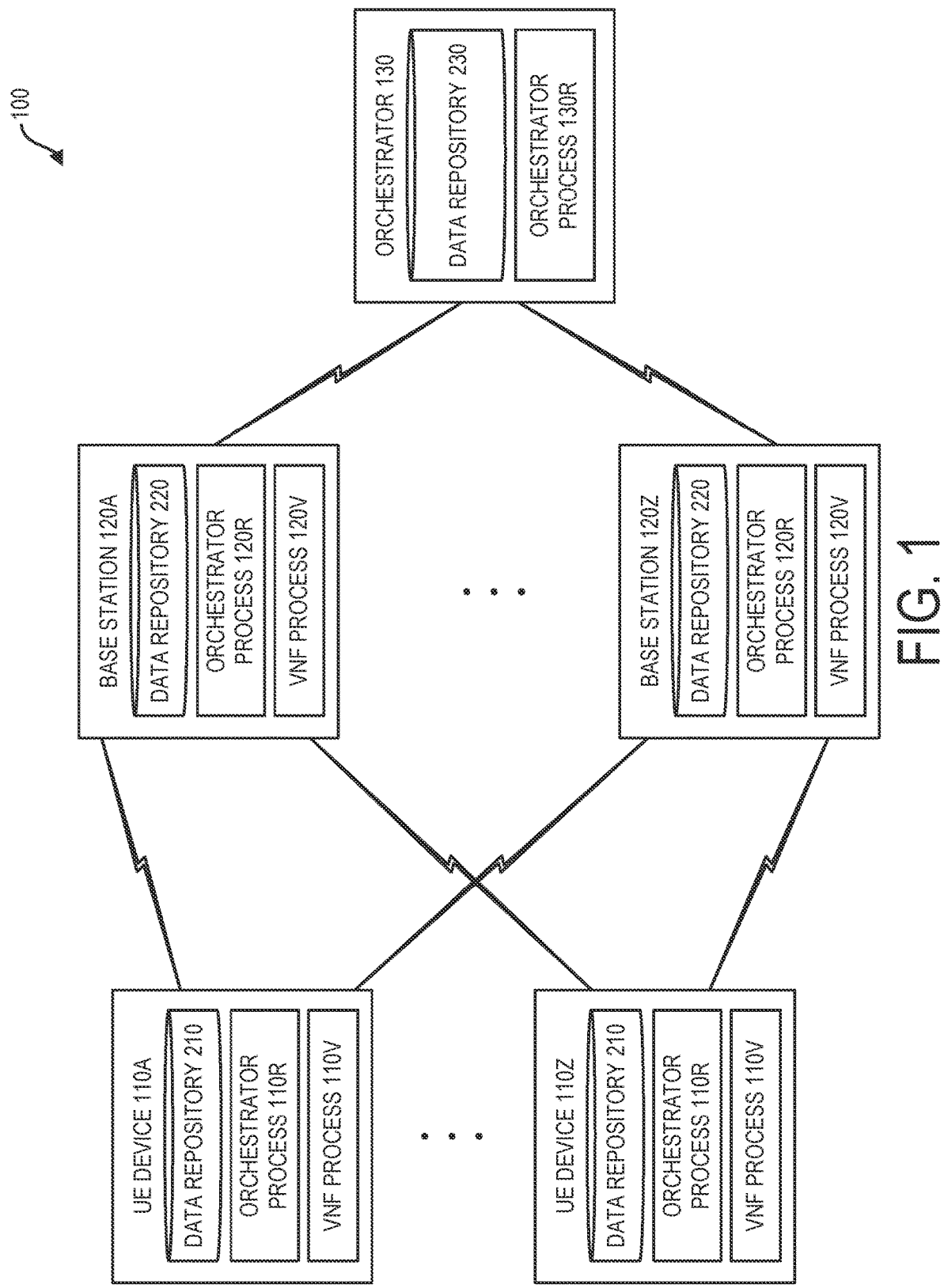
FIG. 1 depicts computing environment according to one embodiment.

Computing environment 100 for secure delivery collection and delivery of user data is shown in FIG. 1. Computing environment 100 can include a plurality of UE devices 110A-110Z, a plurality of base stations 120A-120Z, and one or more orchestrator 130. In one embodiment, UE devices 110A-110Z can be new radio and are compliant UE devices. UE devices 110A-110Z can be in wireless network communication with base stations 120A-120Z, and base stations 120A-120Z can be in wireline network communication with orchestrator 130. In one embodiment, orchestrator 130 can be defined by a computing node of a core network, which core network can be part of an edge enterprise entity network.

Computing environment 100 can be configured to provide secure collection delivery of user data. Computing environment 100 can be configured to collect and process secure user data such as secure user medical health data.

Referring to computing environment 100, respective UE devices 110A-110Z can include orchestration process 120R running on VNF process 120V. Respective base stations 120A-120Z can include orchestration process 120R running on VNF process 120V. Orchestrator 130 can include orchestration process 130R. In respective instances of orchestration process 110R, orchestration process 110R can define an orchestration layer that runs on a VNF layer defined by instances of VNF process 120V in combination with instances of VNF process 110V. UE devices 110A-110Z, base stations 120A-120Z, and orchestrator 130 can include respective data repositories 210, 220, and 230.

According to one embodiment, respective base stations 120A-120Z can be eNodeB base stations compliant with the Fifth Generation (5G) New Radio (NR) standard. According to one embodiment, respective base stations 120A-120Z and respective UE devices 110A-110Z can define a wireless network that facilitates communications according to the New Radio (NR) standard.

Figure 2:
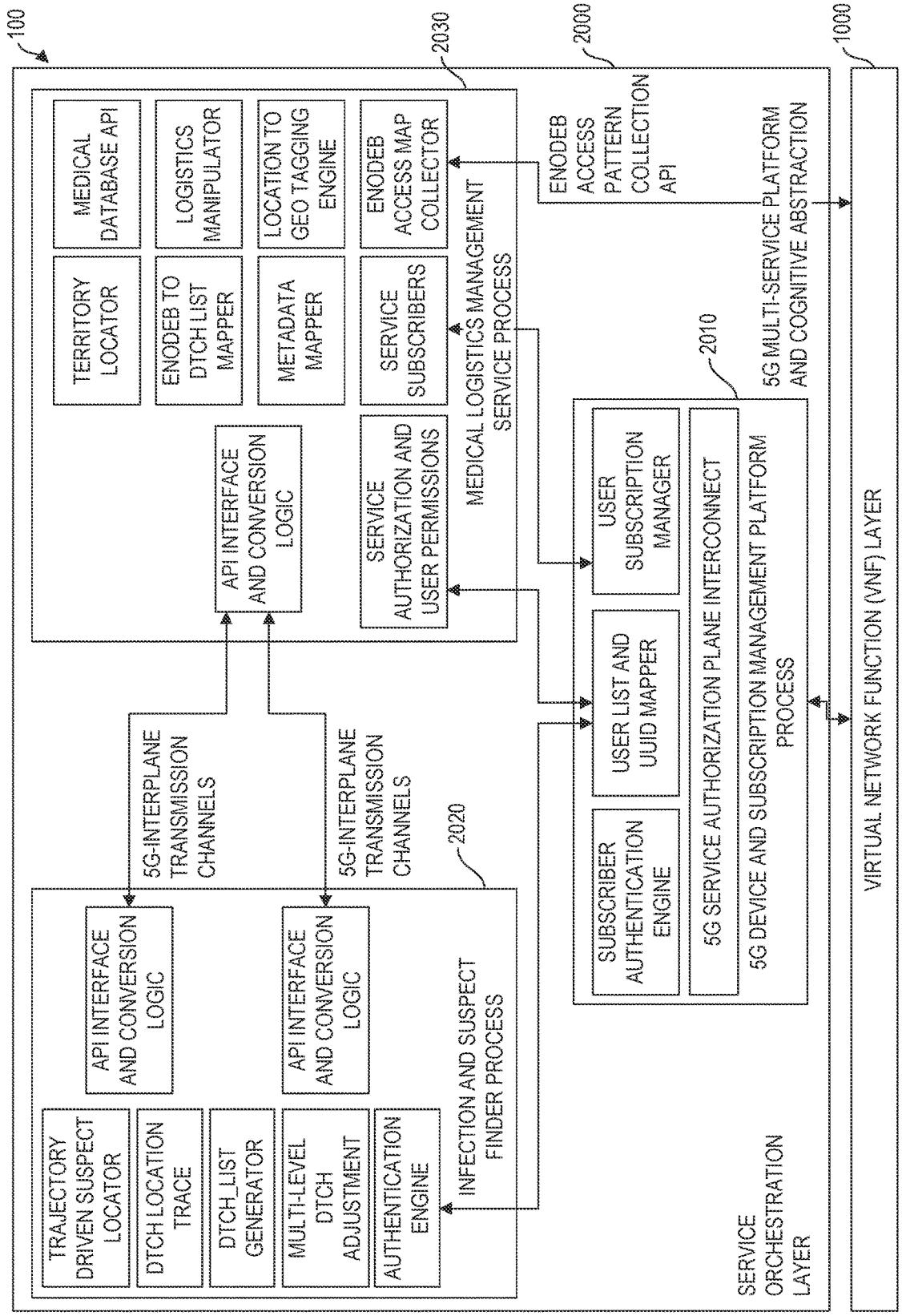
FIG. 2 depicts a computing environment according to one embodiment.

FIG. 2 is a partial open systems interconnection model (OSI model) representation computing environment 100 as shown in FIG. 1. Computing environment 100 can include a virtual network function (VNF) layer running on a physical layer (described further in reference to FIG. 3) and service orchestration layer 2000 running on virtual network function layer 1000. According to one aspect, VNF layer 1000 can be responsible for the allocation of logical channels by which a UE device can communicate with the base station.

According to one embodiment, there is set forth herein obtaining user data from respective ones of a plurality of UE devices by a virtual network function (VNF) layer which has assigned logical channels to respective ones of the UE devices for wireless transmission of the user data; examining data of the user data; and performing processing in dependence on the examining.

According to the NR standard in 5G, the logical channels are known as NR dedicated traffic channels (DTCH). In one aspect, VNF layer 1000 can maintain user to logical channel association data, e.g., in a table which associates UE device identifiers to their assigned logical, e.g., DTCH channels. In one embodiment, user to logical channel association data can be provided as set forth in Table A.

TABLE A

| UE device UUID | DTCH logical channel |
|---|---|
| XX | XX |
| XX | XX |
| ... | ... |

VNF layer 1000 can distribute relevant portions of the user to logical channel association data to respective ones of base stations 120A-120Z and UE devices 110A-110Z to facilitate communication between UE devices 110A-110Z and base stations 120A-120Z. There can be a one-to-one correspondence between DTCH channels and UE devices, identified by UE device identifiers which UE device identifiers serve as identifiers of users. By such features, data collection process 110 is able to facilitate joining between UE devices associated to respective users and base stations and is able to assign DTCH channels to respective UE devices and users.

In one aspect, computing environment 100 can be configured so that user identifying data of the described user to logical channel association data can be restricted from access by service orchestration layer 2000. By such functionality, service orchestration layer 2000 is able to process user data specific to individual users without risk of access to any user identifying data associated to individual users. When service orchestration layer 2000 processes data of specific users, service orchestration layer 2000 can use assigned respective logical (e.g., DTCH) channels as a surrogate identifier of generical users which is absent of any identifier that actually identifies any user or contains any user identifying data. The 5G NR standard facilitates communications wherein a DTCH identifier can be used as a surrogate identification of a user without access of any underlying actual user identifying information.

Referring to FIG. 2, service orchestration layer 2000 of computing environment 100 can include a 5G device and subscription management platform process 2010, infection and suspect finder process 2020, and medical logistics management process 2030.

The 5G device and subscription management process 2010 can be responsible for maintaining a list of registered users of computing environment 100. The 5G and subscription management process 2010 can be configured to maintain a list of registered subscriber users, which list can be used which records whether various UE devices of the various users have installation packages installed therein for participation of a UE device in computing environment 100. However, the subscription list data generated and maintained by the 5G device and subscription management platform process 2010 can be absent of any collected user data such as collected sensitive medical user data. Instead, computing environment 100 can be configured so that sensitive user medical health data can be associated to assigned logical channels, e.g., 5G DTCH channels without reference to any user identifying data.

Infection suspect finder process 2020 can be responsible for maintaining a logical channel list which includes location data of users over time, as well as sensitive medical health data of users associated to logical channels, but which is absent of user identifying data.

Figure 3:
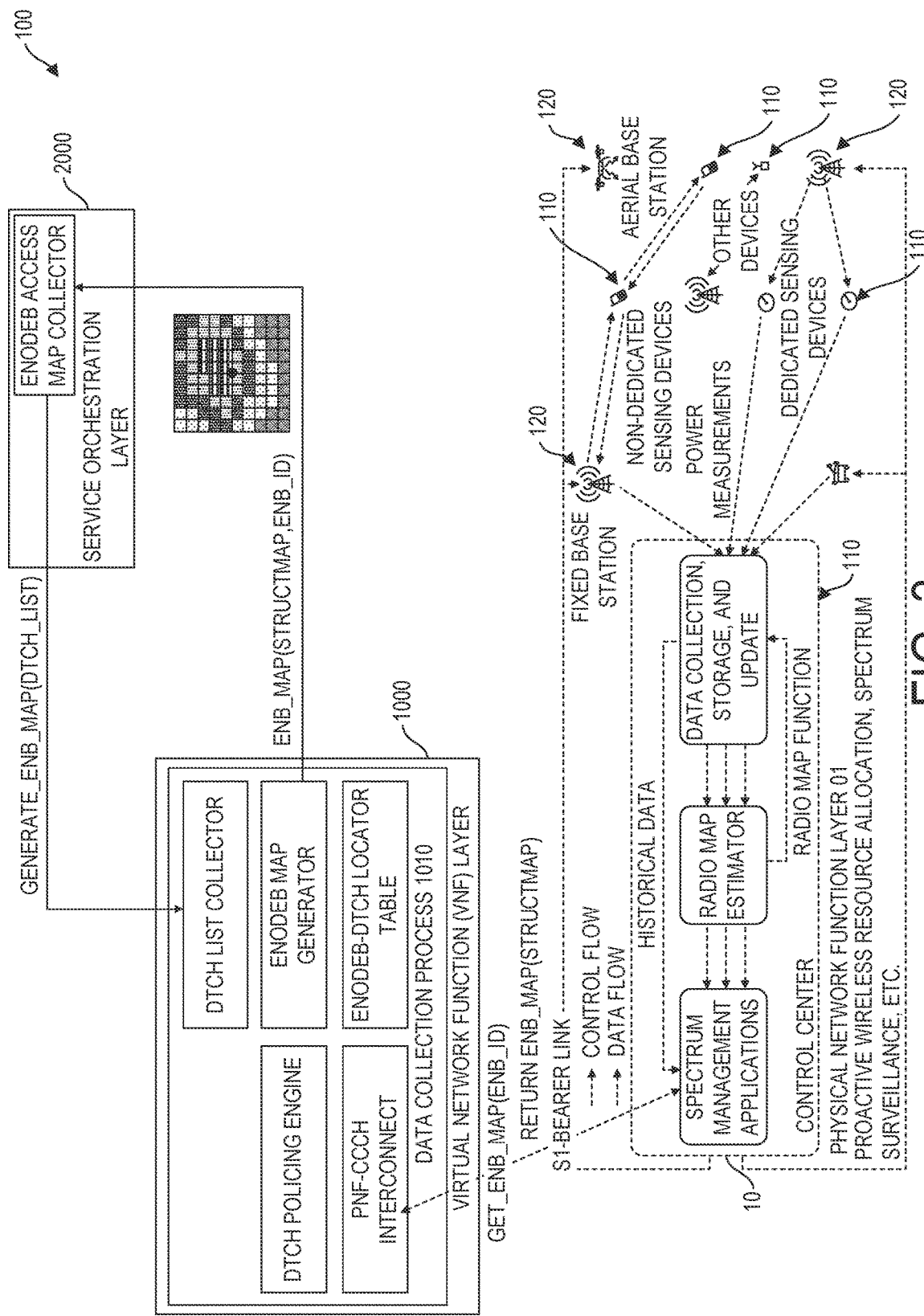
FIG. 3 depicts a computing environment according to one embodiment.

Medical logistics management service process 2030 can be responsible, e.g., for aggregating geospatial mapping data from a plurality of base stations and for generating mapping data which aggregates mapping data from multiple base stations. FIG. 3 illustrates an OSI schematic view of computing environment 100 illustrating physical layer features as well as additional details of virtual network function layer 1000, including the described user to logical channel association data provided within data collection process 1010 by an "eNodeB-DTCH locator table". Referring to FIG. 3, UE devices 110A-120Z are indicated generically by the designator UE device 110 and base stations 120A-120Z are indicated generically by the indicator base station 120.

Regarding physical network function features of computing environment 100, physical network layer functions of computing environment 100 can be performed by physical layer functions of computing nodes 10 which can be disposed respectively by respective ones of UE devices 110 and base stations 120. Physical network layer functions of computing nodes 10 can include, e.g., spectrum management functions, radio estimator functions, data collection, and storage functions.

Further referring to FIG. 3, service orchestration layer 2000 can iteratively communicate data with collection process 1010 to initiate data collection requests. In response to receipt of a data collection request, data collection process 110 can use the described user to logical channel association data to request user data.

Physical network function layer 01 can responsively send user medical health data with location data via its assigned DTCH logical channel to data collection process 110 of VNF layer 1000. Data collection process 110 of VNF layer 1000 can push the received medical health data with location data up to service orchestration layer 2000. When pushing the generated user medical health data up to service orchestration layer 2000, data collection process 110 can be restricted from accessing any user identifying data so that user medical health data pushed up to service orchestration layer 2000 can include DTCH data without representing surrogate user identifying data without inclusion of any UE device identifying data or other user identifying data. In some embodiments, data collection process 1010 defining VNF layer 1000 can provide geospatial mapping data that specifies a geospatial map location of various users. For such functionality, VNF layer 1000 can be in communication with a geospatial mapping service, e.g., GOOGLE MAPS® (GOOGLE MAPS® is a registered trademark of Google, Inc.). When VNF layer 1000 provides geospatial mapping data, VNF layer 1000 can push the geospatial mapping data to service orchestration layer 2000 together with the user medical health data and location data with users represented generically by their respective associated logical channels, and with the data push being absent of any user identifying data. In another embodiment, geospatial mapping functionality can be performed entirely by service orchestration layer 2000.

VNF layer 1000 can include data collection process 110. Data collection process 110 can reference the described user to logical channel association data to obtain user medical health data. User medical health data can include multiple data tags as are summarized in Table B.

TABLE B

| UE device UUID | Logical channel (e.g., DTCH) | Timestamp | Location coordinates (latitude, longitude) | Infection status (1 = infected, 0 = Not infected) |
|---|---|---|---|---|
| XX | XX | XX | XX | XX |
| XX | XX | XX | XX | XX |

In one embodiment, UE devices 110A-110Z can transmit user medical health dataset as shown in Table A to their respective base stations 120A-120Z. Data tags as shown in Table B can include, e.g., UE device UUID, logical channel identifier, timestamp, location coordinates, infection status. Embodiments herein recognize that with use of various 5G technologies, location of a UE device can be determined with high accuracy. UE devices 110A-110Z and RAN 500N can be compliant with Fifth Generation (5G) technologies, including the New Radio (NR) standard, documents of 3GPP TS 28.530 V15.1.0 Release 15 by the $3^{rd}$ Generation Partnership Project (3GPP), and the technical reports of Release 16 of the 3GPP (3GPP Release 16 reports). Densely deployed access nodes (ANs) can increase the line-of-sight (LoS) probability between the user node (UN) and ANs, thus enabling highly accurate time of arrival (ToA) estimation. ANs in 5G networks will be employed with smart antenna solutions such as antenna arrays which in turn enable also accurate direction of arrival (DoA) estimation. In general, all the aforementioned measurements, among others, can be efficiently estimated from uplink (UL) pilots' signals in a network-centric manner such that additional positioning dedicated signals are not necessarily required. 5G networks can provide a convenient environment for positioning due to large antenna arrays and wide bandwidths which, in turn, enable highly accurate DoA and ToA estimation including in LoS conditions. Next generation positioning maps can be powered with 5G network's AN positioning with use of 5G technologies UE devices and can communicate with other devices and send the current positioning location, including latitude, longitude coordinates, and height of the device using altitude calculation. Highly efficient positioning and location identification service in a 5G orchestration plane can thus be provided. Precise positioning based on global navigation satellite systems (GNSS) has become increasingly relevant for commercial use cases across different areas. GNSS positioning is based on information about signals and positions of multiple satellites, and is often assisted by information from mobile devices provided by cellular network operators. Real Time Kinematic (RTK) is a technology that greatly improves precision of GNSS positioning, narrowing it from a few meters to mere centimeters. Embodiments herein can use GNSS-RTK assistance data signaling which is supported by New Radio (NR) devices as provided by Release 15 by the $3^{rd}$ Generation Partnership Project (3GPP) and the technical reports of Release 16 of the 3GPP (3GPP Release 16 reports).

On receipt of a dataset as shown in Table B, a respective base station, by VNF process 120V defining VNF layer 1000, can pass the dataset to service orchestration layer 2000 removing the user identifying UE device UUIDs so that the service orchestration layer 2000 receives the dataset as shown in Table B absent the UE device UUID. Service orchestration layer 2000 can store the Table B data minus the user identifying data into a data repository, e.g., data repository 230. Service orchestration layer 2000, e.g., by a process thereof running on a base station and/or orchestrator 130 can ascertain infection suspects to provide an adapted dataset having a suspected infection status field as shown in Table C.

TABLE C

| Logical channel (e.g., DTCH) | Timestamp | Location coordinates (latitude, longitude) | Infection status (1 = infected, 0 = Not infected) | Suspected infection status (probability assigned between 0.0 and 1.0) |
|---|---|---|---|---|
| XX | XX | XX | XX | XX |
| XX | XX | XX | XX | XX |

Service orchestration layer 2000, for users who have a current infection status of not infected, can ascertain a suspected infection status. Ascertaining a suspected infection status can include assigning an infection probability to users having a current infection status as uninfected. Embodiments herein can work in 5G service orchestration in conjunction with Virtual Network Function and 5G's user-grounded positioning system to detect suspicious affected people of communicable illness. As noted, 5G has an efficient geolocation tracking system that works with the AN based positioning system. Embodiments herein can use the geolocation tracking system and geofencing as a backbone interface and our invention runs on top of these precise location services offered at 5G Virtual Network Function. Embodiments herein running in a service orchestration plane can be connected to a medical service in the plan that gives a backtracking computation trigger for a specific user or set of users. Medical services can comprise integration of an authentication enabled platform to avoid misuse of user location tracking. Consent of a user can allow sending medical information via logical channels which are absent of any user identifying data. Once medical service authentication is performed, the medical record of pre-defined time interval can be pushed to a service with its 5G UUID number. In some embodiments, a VNF function can request user information from a 5G UUID. The user information can include international mobile equipment identity (IMEI) or international mobile subscriber identity (IMSI). The collected IMSI can be transferred to VNF layer 1000 with the timeline inputs to trace the user location in the past few days. The service can then examine the location of a communicable illness from user records.

In one embodiment, service orchestration layer 2000 for assigning an infection probability to users with a current uninfected status can determine a number of historical crossings, e.g., within a threshold period of time of a current time. A crossing can be determined to occur, e.g., when first and second users are within a threshold distance of one another, e.g., 6 feet or two meters. Based on the historical crossing data, service orchestration layer 2000 can assign an infection probability.

Figure 6:
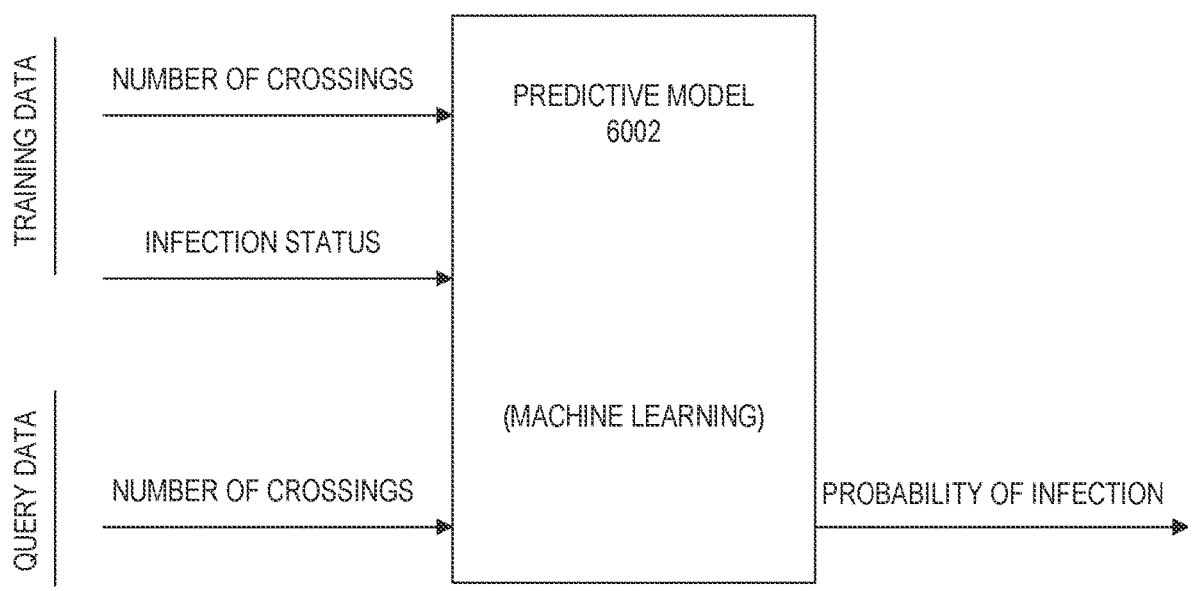
FIG. 6 depicts a predictive model trained by machine learning according to one embodiment.

For assigning an infection probability based on a number of historical crossings, service orchestration layer 2000 can query a certain predictive model 6002 as shown in FIG. 6 trained by machine learning. Predictive model 6002 can have been trained by training datasets comprising (a) numbers of crossings of a certain uninfected user with an infected user, and (b) subsequent infection status of the uninfected user. Predictive model 6002, once trained, is able to respond to query data. Query data can include the past number of detected crossings. Output data in response to the query data can include a value that specifies a probability of infection.

In one embodiment, service orchestration layer 2000 for assigning an infection probability to users can predict subsequent crossings between uninfected users and can then assign infection probability based on the predicted crossings by querying the described certain predictive model 6002 trained by training datasets comprising (a) numbers of crossings of a certain uninfected user with an infected user, and (b) subsequent infection status of the uninfected user. For predicting subsequent crossings, service orchestration layer 2000 can include historical travel data for detected users for whom user data is collected.

Service orchestration layer 2000 can ascertain a current direction of respective users using the recent historical location data. The current direction of the respective users can be regarded to be a trajectory. Service orchestration layer 2000 can predict a subsequent path (position over time) of respective users using the determined current direction of the respective users. Service orchestration layer 2000 for predicting a subsequent path can apply the assumption that a user will continue to travel in its current direction for a next N time periods. Service orchestration layer 2000 can ascertain predictions for future crossings by examining the respective predicted paths for the respective users, and identifying crossings between users when traveling along their respective paths, which predicted path is based on a detected current path.

With predicted subsequent crossings identified, service orchestration layer 2000 can query predictive model 6002 to ascertain a probability of infection based on the predicted number of crossings of the respective users. Service orchestration layer 2000 can query predictive model 6002 using a predicted number of crossings ascertaining using the historical path data for the respective users as set forth herein.

Figure 4:
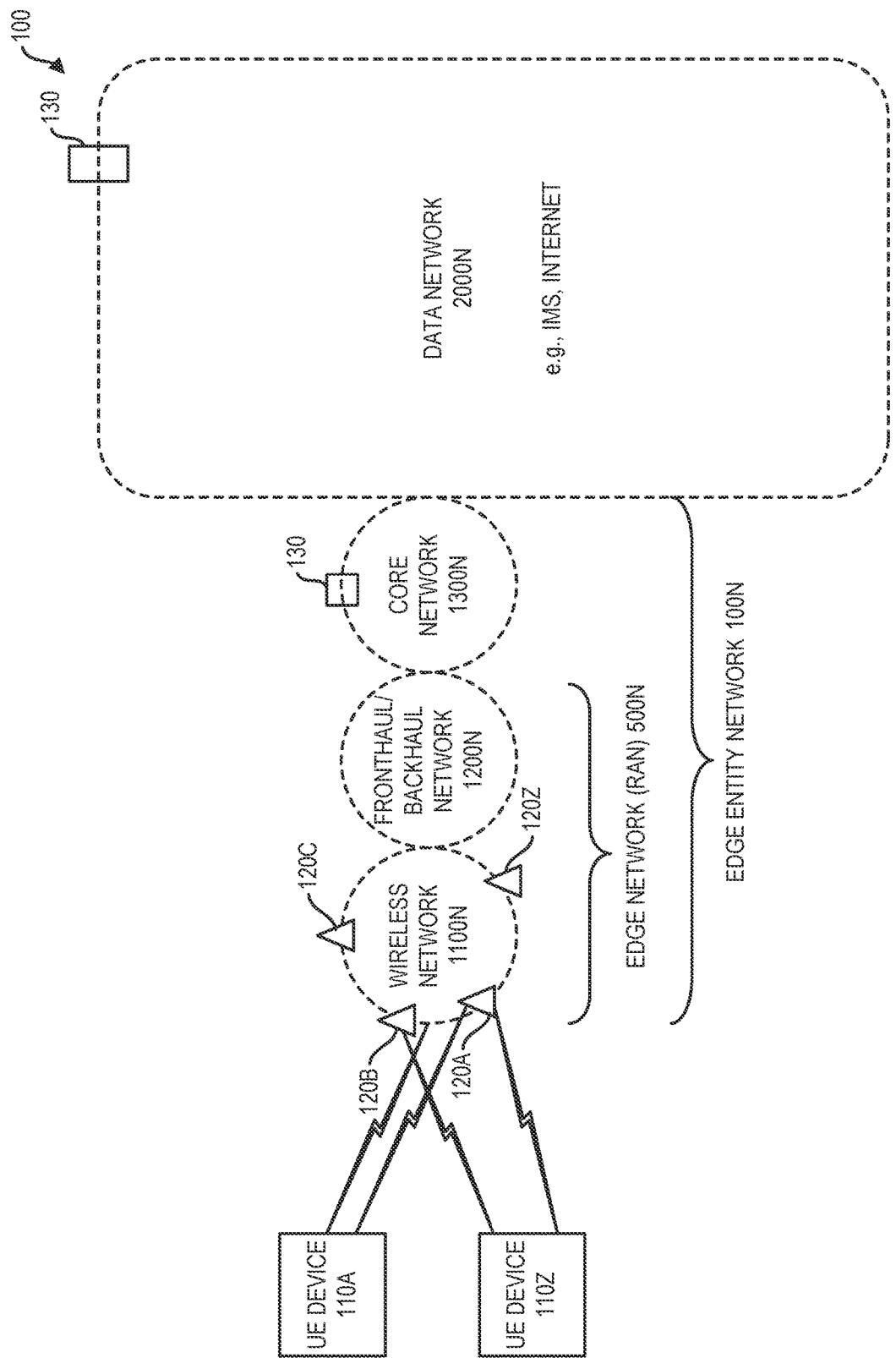
FIG. 4 depicts a computing environment according to one embodiment.

A network schematic view of computing environment 100 is shown in FIG. 4. FIG. 4 depicts computing environment 100 in further detail. Computing environment 100 can include UE devices 110A-110Z in communication with data network 2000N via a plurality of edge enterprise entity networks 1000N, one of which is shown. Respective edge enterprise entity networks can include edge infrastructure owned, operated, and/or controlled by respective different edge entities. An edge enterprise entity can own, operate, and/or control the edge network infrastructure comprising wireless network 1100N, fronthaul/backhaul network 1200N, and core network 1300N. Different respective ones of the edge enterprises can be telecommunications network providers which are sometimes referred to as communication service providers (edge enterprise entity CSPs). Wireless network 1100N can include base stations 120A-120Z, which can be provided by eNodeB base stations, according to one embodiment.

In the described embodiment of FIG. 4, the combination of a wireless network 1100N and a fronthaul network 1200N can define edge network 500N provided by a radio access network (RAN) 500N. Edge network 500N can define edge infrastructure. The depicted RAN 500N provides access from UE devices 110A-110Z to respective core networks 1300N. In an alternative embodiment, one or more of edge network 500N can be provided by a content delivery network (CDN). UE devices 110A-110Z and RAN 500N can be compliant with the New Radio (NR) standard, and documents of 3GPP TS 28.530 V15.1.0 Release 15 by the 3$^{rd}$ Generation Partnership Project (3GPP) and the technical reports of Release 16 of the 3GPP (3GPP Release 16 reports).

Each of the different UE devices 110A-110Z can be associated to a different user. A UE device of UE devices 110A-110Z, in one embodiment, can be a computing node device provided by a client computer, e.g., a mobile device, e.g., a smartphone or tablet, a laptop, smartwatch or PC that runs one or more program that facilitates access to services by one or more service provider. A UE device of UE devices 110A-110Z can alternatively be provided by, e.g., an internet of things (IoT) sensing device.

Embodiments herein recognize that hosting service functions on one or more computing node within an edge enterprise entity network 1000N can provide various advantages including latency advantages for speed of service delivery to end users at UE devices 110A-110Z. Edge enterprise entity hosted service functions can be hosted, e.g., within an edge network 500N or otherwise within edge enterprise entity network 1000N.

Data network 2000N can include, e.g., an IP multimedia sub-system (IMS) and/or "the internet" which can be regarded as the network of networks that consists of private, public, academic, business, and government networks of local to global scope linked by a broad array of electronic, wireless, and optical networking technologies. Data network 2000N can include, e.g., a plurality of non-edge data centers. Such data centers can include private enterprise data centers as well as multi-tenancy data centers provided by IT enterprises that provide for hosting of service functions developed by a plurality of different enterprise entities.

Some edge entities that own, operate, and/or control edge infrastructure such as provided by an edge network 500N can offer multi-tenancy hosting services that permit enterprises other than edge enterprises to host their applications on one or more edge node within edge enterprise entity network 1000N.

Orchestrator 130, according to one embodiment, can be deployed on a computing node of core network 1300N. According to another embodiment, orchestrator 130 can be deployed on one or more computing node of data network 2000N. According to one embodiment, orchestrator 130 can be distributed between computing nodes of core network 1300N and data network 2000N. According to one embodiment, orchestrator 130 can be co-located on computing nodes of core network 1300N and data network 2000N. Management and Orchestration (MANO) computing environment, in one embodiment, can be in accordance with the documents of 3GPP TS 28.530 V15.1.0 Release 15 by the $3^{rd}$ Generation Partnership Project (3GPP) and the technical reports of Release 16 of the 3GPP (3GPP Release 16 reports).

Various available tools, libraries, and/or services can be utilized for implementation of predictive model 6002. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring, and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation.). A machine learning service provided by IBM® WATSON® can provide access to a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring, and retraining deployed models. Configuring of predictive model 6002 can include use of, e.g., support vector machines (SVM), Bayesian networks, neural networks, and/or other machine learning technologies.

A method for performance by orchestrator 130 interoperating with base stations 120A-120Z and UE devices 110A-110Z is described with reference to the flowchart of FIG. 5. At block 1301, orchestrator 130 can be sending an installation package to base stations owned, operated, and/or controlled by edge enterprise entities that own, operate, and/or control orchestrator 130. On receipt of the installation packages, base stations 120A-120Z can install the received installation packages at block 1201.

The installation package sent at block 1301 can include, e.g., libraries and executable code for providing the functions of VNF process 120V and orchestration process 120R running on respective base stations 120A-120Z, which processes define VNF layer 1000 and service orchestration layer 2000, respectively. At block 1101, UE devices 110A-110Z can be sending registration data to orchestrator 130. Registration data can be entered into a displayed webpage-based user interface displayed on display of a UE device. The registration data can be sent to orchestrator 130 via a network that includes base stations 120A-120Z or another network.

Orchestrator 130, on receipt of the registration data, can establish a user subscription for storage into data repository 230 as shown in FIG. 1, and on receipt of the registration data, orchestrator 130 can send an installation package to UE devices 110A-110Z. In response to receipt of the installation package sent at block 1302, UE devices 110A-110Z can install the installation package at block 1102. The installation package installed at block 1102 can include, e.g., libraries and executable code to define VNF process 110V and orchestration process 110R running on respective UE devices 110A-110Z as shown in FIG. 1, which processes define respectively VNF layer 1000 and service orchestration layer 2000 as described in reference to FIGS. 2 and 3. The installation packages installed at block 1201 and 1102, respectively, can also define functions of physical network function layer 01 as described in reference to FIG. 3.

In response to the sending of the installation package at block 1302, orchestrator 130 can proceed to block 1303. At block 1303, orchestrator 130 can send update data to base stations 120A-120Z updating the base stations 120A-120Z as to new UE device identifiers that map to registered users of computing environment 100. Thus, when base stations 120A-120Z receive a join request from a new UE device that has recently registered, base stations 120A-120Z will be able to recognize such new UE devices. At block 1103, UE devices of UE devices 110A-110Z can be sending join requests for receipt by base stations 120A-120Z. As noted, base stations 120A-120Z can recognize previously registered UE devices and can accordingly respond appropriately in accordance with features of computing environment 100.

In response to receipt of a join request, a base station of base station 120A-120Z receiving the strongest signal strength from a UE device of UE devices 110A-110Z can respond at block 1202 by the sending of channel data indicating an assigned DTCH channel for further communications between a certain UE device, e.g., UE device 110A and a certain base station, e.g., base station 120A. At block 1104 and 1203, join communications can be performed so that a certain UE device, e.g., UE device 110A, becomes connected to a certain base station 120A.

As indicated by the return arrow, UE devices 110A-110Z can be iteratively performing the loop of blocks 1103 and 1104 to iteratively send join requests to new base stations and to iteratively receive join communications to communicate on new logical DTCH channels as they are assigned. As UE devices may change logical channels on which they communicate to different base stations, base stations 120A-120Z in VNF layer 1000 can maintain the described user to logical channel association data or relevant portions thereof so that base stations 120A-120Z can remain in communication to respective UE devices to which they are joined. However, the user identifying data of the described user to logical channel association data are not shared with service orchestration layer 2000, and thus, applications running in service orchestration layer 2000 are unable to recover a UE device and UE information from data transmissions by service orchestration layer 2000.

Figure 5:
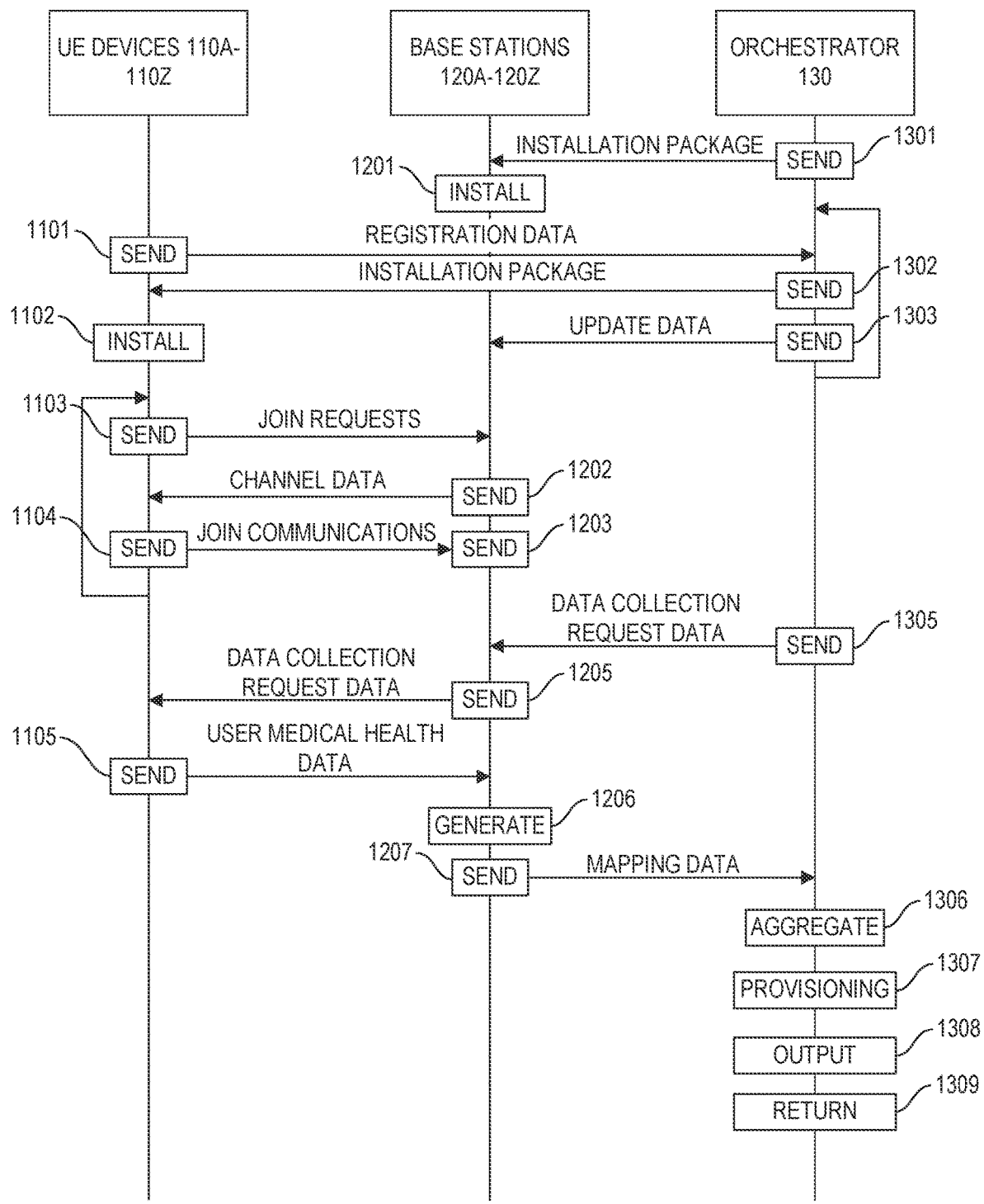
FIG. 5 is a flowchart for performance by an orchestrator interoperating with other components according to one embodiment.

Referring further to the flowchart of FIG. 5, orchestrator 130 can send data collection request data at block 1305 to initiate data collection. The data collection request data sent at block 1305 can be sent to base stations 120A-120Z being owned, operated, and/or controlled by an edge enterprise entity operating orchestrator 130. Base stations 120A-120Z receiving the data collection request data sent at block 1305 can responsively, at send block 1205, send data collection request data to UE devices of UE devices 110A-110Z currently joined and connected to base stations 120A-120Z.

In response to receipt of the data collection request data sent at block 1205, respective UE devices 110A-110Z at block 1105, by VNF process 110V, can send user medical health data to respective base stations of base stations 120A-120Z to which they are currently joined and connected. User medical health data sent at block 1105 can include sensitive user medical health data which is sent on the described assigned specific isolated logical channels respectively associated to respective ones of UE devices 110A-110Z.

In response to the receipt of the user medical health data sent at block 1105, base stations 120Z-120Z, by VNF process 120V, can at block 1206 generate geospatial mapping data that specifies a geospatial map location of various users. The geospatial map can specify infrastructure features such as roads and buildings. For such functionality, VNF layer 1000 can be in communication with a geospatial mapping service, e.g., GOOGLE MAPS® (GOOGLE MAPS® is a registered trademark of Google, Inc.).

In response to the generation of mapping data, base stations 120A-120Z at block 1207, by VNF process 120V, can send geospatial mapping data to orchestrator process 130R of orchestrator 130. At the sending of geospatial mapping data at block 1207, base stations 120A-120Z can associate user medical health data with assigned logical channels, but the user health medical data can be absent of any specific user identifying data. For sending of geospatial mapping data at block 1207, VNF layer 1000 can push the received medical health data with location data up to service orchestration layer 2000. When pushing the generated user medical health data up to service orchestration layer 2000, data collection process 110 can be restricted from accessing any user identifying data so that user medical health data pushed up to service orchestration layer 2000 can include DTCH data without representing surrogate user identifying data without inclusion of any UE device identifying data or other user identifying data. When VNF layer 1000 provides geospatial mapping data, VNF layer 1000 can push the geospatial mapping data to service orchestration layer 2000 together with the user medical health data and location data with users represented generically by their respective associated logical channels, and with the data push being absent of any user identifying data. In another embodiment, geospatial mapping functionality can be performed entirely by service orchestration layer 2000.

With features set forth herein, individual users can be represented by assigned logical data channels, but there is no actual user identifying data, e.g., device UUID information associated to the assigned logical channel. In response to the receipt of the geospatial mapping data sent at block 1207, orchestrator 130, by service orchestration layer 200, at aggregate block 1306 can aggregate mapping data associated to a plurality of different base stations. Orchestrator 130, by service orchestration layer 2000 at aggregate block 1306, can also identify suspected infected users. In identifying suspected infected users, orchestrator 130, by orchestrator process 130R defining service orchestration layer 2000 can assign infection probabilities to users having a current status of uninfected.

In one embodiment, service orchestration layer 2000 for assigning an infection probability to users with a current uninfected status can determine a number of historical crossings, e.g., within a threshold period of time of a current time. A crossing can be determined to occur, e.g., when first and second users are within a threshold distance of one another, e.g., 6 feet or two meters. Based on the historical crossing data, service orchestration layer 2000 can assign an infection probability.

For assigning an infection probability based on a number of historical crossings, service orchestration layer 2000 can query certain predictive model 6002 as shown in FIG. 6 trained by machine learning. Predictive model 6002 can have been trained by training datasets comprising (a) numbers of crossings of a certain uninfected user with an infected user, and (b) subsequent infection status of the uninfected user. Predictive model 6002, once trained, is able to respond to query data. Query data includes past number of detected crossings. Output data in response to the query data can include a value that specifies a probability of infection.

In one embodiment, service orchestration layer 2000 for assigning an infection probability to users can predict subsequent crossings between uninfected users and can then assign infection probability based on the predicted crossings by querying the described certain predictive model trained by training datasets comprising (a) numbers of crossings of a certain uninfected user with an infected user, and (b) subsequent infection status of the uninfected user. For predicting subsequent crossings, service orchestration layer 2000 can include historical travel data for detected users for whom user data is collected.

Service orchestration layer 2000 can ascertain a current direction of respective users using the recent historical location data. The current direction of the respective users can be regarded to be a trajectory. Service orchestration layer 2000 can predict a subsequent path (location over time) of respective users using the determined current direction of the respective users. Service orchestration layer 2000 for predicting a subsequent path can apply the assumption that a user will continue to travel in its current direction for a next N time period. Service orchestration layer 2000 can ascertain predictions for future crossings by examining the respective predicted paths for the respective users and identifying crossings between users when traveling along their respective paths, which predicted path is based on a detected current path.

With predicted subsequent crossings identified, service orchestration layer 2000 can query predictive model 6002 to ascertain a probability of infection based on the predicted number of crossings of the respective users. Service orchestration layer 2000 can query predictive model 6002 using a predicted number of crossings ascertaining using the historical path data for the respective users as set forth herein.

Figure 7:
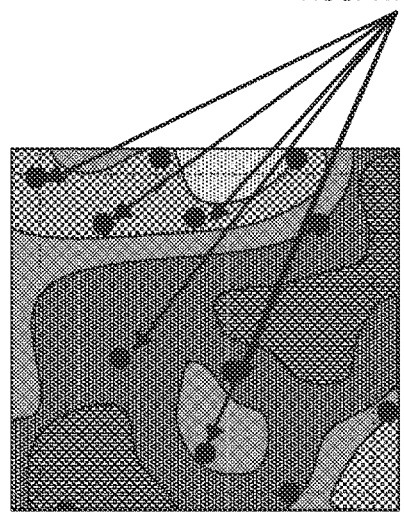
FIG. 7 depicts a heat map according to one embodiment.
Figure 8:
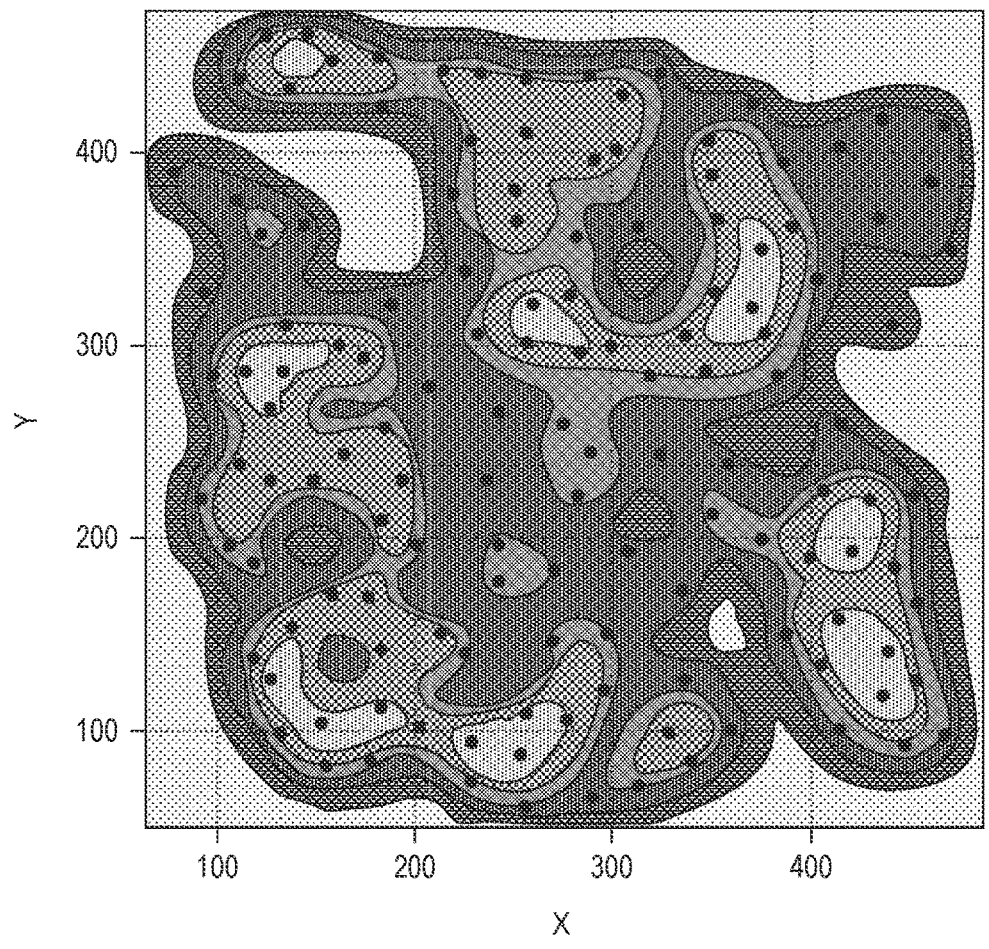
FIG. 8 depicts a heat map according to one embodiment.
Figure 9:
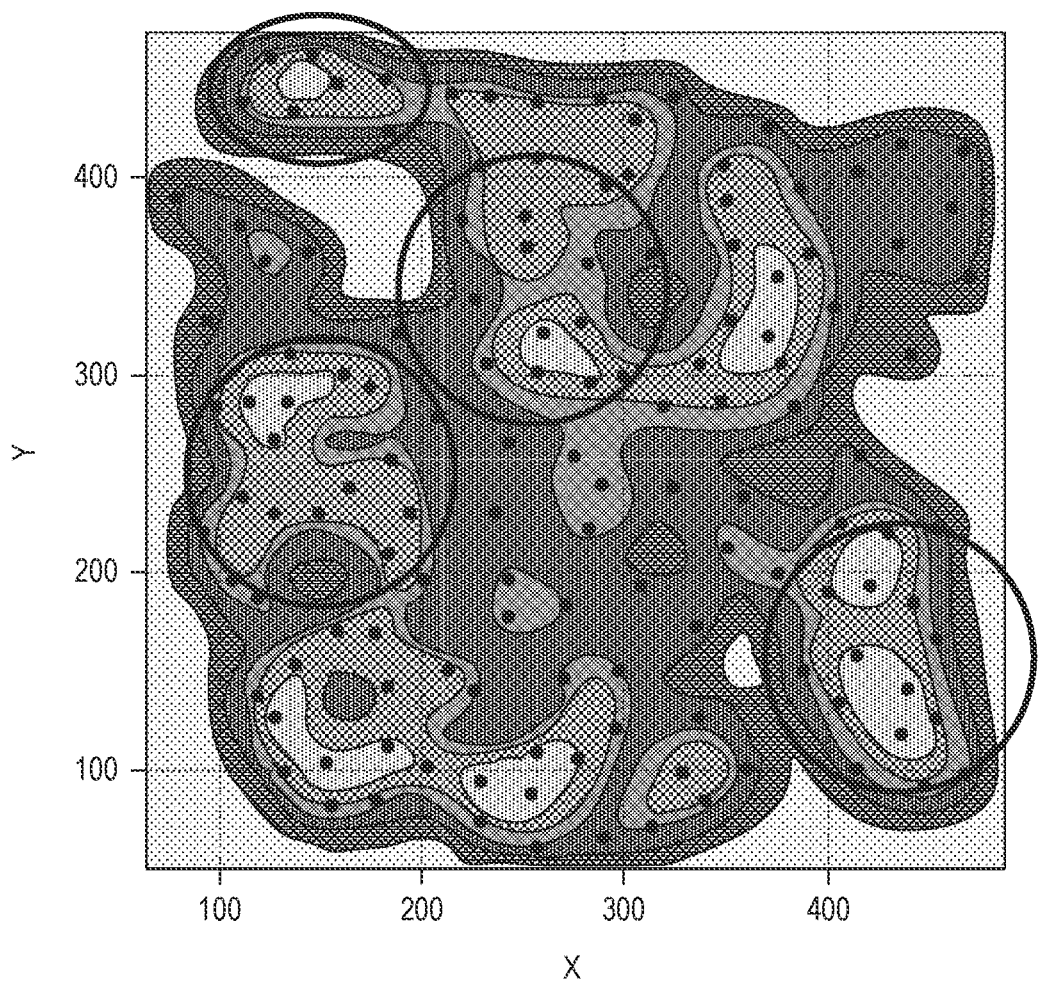
FIG. 9 depicts a heat map according to one embodiment.

Using the predicted infection level data (assigned probability of infection data), orchestrator 130, by service orchestration layer 2000, can generate heat maps as are shown in FIGS. 7 through 9. In the heat maps, the darkest regions specify regions of highest infection intensity, and lighter regions specify regions of lesser infection intensity. The determined infection intensity can be a function of recorded infection statuses for users, as well as values for assigned probabilities for infection. A region can have a low number of infected users, but in a heat map can be recorded as a high infection intensity region based on identified infection suspects having assigned infection probabilities with substantial values.

At provisioning block 1307, orchestrator 130 by service orchestration layer 2000, can provision resources that counteract and address an infection over a region, e.g., by assigning vaccine dosages or other infection treatment resources based on and in dependence of infection intensity levels as determined by service orchestration layer 2000 and as indicated by the mapping data of the heat maps. Service orchestration layer 2000 according to one embodiment, can provision resources proportionally to a detected level of infection intensity, with regions of greater determined infection intensity levels being provisioned with proportionally greater medical treatment resources. In FIG. 9, the circled regions are regions determined by service orchestration layer 2000 to have the greatest intensity of infection, and accordingly, can be provisioned by service orchestration layer 2000 with the greatest amount of medical treatment resources. At output block 1308, orchestrator 130 can initiate automatic delivery of medical treatment resources by an autonomous vehicle. In response to completion of block 1308, orchestrator 130 can proceed to block 1309. At block 1309, orchestrator 130 can return to block 1305 and can iteratively perform the loop of blocks 1305 to 1309 during a deployment period of orchestrator 130. Orchestrator 130 simultaneously can also iteratively perform the loop of blocks 1302 and 1303 during a deployment period of orchestrator 130.

Provisioning of medical treatment resources to a medical facility, with appropriate configuration of output block 1308, can include automated distribution of medical treatment resources to a medical facility, e.g., by automated placement of a delivery order at output block 1308 to an enterprise owned or external vehicle courier service, or by initiation at output block 1308 of automated, e.g., robotic medical resource stocking of an autonomous vehicle, and initiation at output block 1308 of route travel to a destination, e.g. medical facility, by the autonomous vehicle.

There is set forth herein, according to one embodiment, obtaining medical health user data from respective ones of a plurality of UE devices by a virtual network function (VNF) layer which VNF layer has assigned logical channels to respective ones of the UE devices for wireless transmission of the user data, wherein the VNF layer maintains user to logical channel association data associating user identifying data to logical channels assigned to users identified by the user identifying data; examining, by a service orchestration layer that runs on top of the VNF layer, medical health data of the user medical health data, wherein the service orchestration layer is configured so that the service orchestration layer is restricted from accessing the user identifying data of the user to logical channel association data; and performing processing in dependence on the examining. The performing processing in dependence on the examining can include, for example, the described processing performed at block 1306, block 1307, and/or block 1308.

Medical treatment resources herein can include medicine, e.g., vaccine, medical equipment, e.g., syringes, bandages, tables, user health monitoring equipment, and the like, as well as personnel, e.g., doctors, nurses, technicians. Service orchestration layer 2000 can provision resources in dependence on an illness, e.g., infection intensity level in a region. The illness intensity level, as set forth herein, can be a function of a count of users having an infected status, and an assigned probability of being infected to other users. Automated autonomous vehicle stocking can be performed with autonomous robot pick and packing technologies, e.g., robot technologies under the DEMANTIC® product line, available from the Kion Group AG. Autonomous vehicle routing can be provided with use of the TRIMBLE AUTOMOTIVE POSITIONING SOLUTION® available from Trimble, Inc. and the NVIDIA® self driving car software, hardware, and infrastructure suite available from Nvidia Corporation.

According to one embodiment, service orchestration layer 2000 can provision medical treatment resources as set forth in Tables D and E.

TABLE D

| | REQUIREMENT_MAP |
|---|---|
| 'eNodeB_1' => | { |
| | 'infected' => 10 |
| | 'Exposed' => 1000 |
| | } |
| 'eNodeB_2' => { | |
| | 'infected' => 5 |
| | 'Exposed' => 1507 |
| | } |
| | ... |
| } | ... |

TABLE E

| | MEDICATION_REQ_MAP | |
|---|---|---|
| 'eNodeB_1' => | { | |
| | 'ITEM_1' => | 10 |
| | 'ITEM_2' => | 100 |
| | 'ITEM_3' => | 36 |
| | 'ITEM_4' => | 19 |
| | 'ITEM_5' => | 99 |
| } | | |
| 'eNodeB_2' => { | | |
| | 'ITEM_1' => | 75 |
| | 'ITEM_2' => | 780 |
| | 'ITEM_3' => | 975 |
| | 'ITEM_4' => | 126 |
| | 'ITEM_5' => | 934 |
| | } | |
| | ... | |
| } | | |

Referring to Tables D and E, it is seen that service orchestration layer 2000, according to one scenario, can provision a second geographical region to include increased resources relative to a first region in spite of having fewer determined infected users. The reason is that service orchestration layer 2000 can ascertain a greater number of suspected infected users in the second region, as determined by the assignment of infection probability values to uninfected user. In ascertaining that there are suspected infected users, service orchestration layer 2000 can assign an infection probability to users having a current status of uninfected.

Embodiments herein provide a method, system, and apparatus working in the 5G service orchestration layer, communicating with existing services of infected users and infection suspect through DTCH logical channels established using 5G's physical network function and eNodeB logins upon user consent. Embodiments herein can provide a radio access map of eNodeBs for selected infected and suspicious UE devices and can locate the operation region of the devices and can proactively trigger medical logistics computation for communicable illness.

Embodiments herein can compute the medication requirement for the illness based on exposure probability derived using a multi-level hierarchical DTCH_LIST and can predict a medical logistics requirement based on the number of exposed people and level of illness exposure in the region. This medical logistics data is pushed to respective subscribers for logistics optimization and maintaining real-time proactive stock at desired locations based on suspected people in the region. This will help in getting the medication locally when exposed people detect positive infection and further helps in isolating the regions as the people need not required to move across the regions for medical treatment resources, e.g., medicines such as vaccines.

Embodiments herein recognize that artificial intelligence simplifies the lives of patients, doctors and hospital administrators by performing tasks that are typically done by humans, but in less time and at a fraction of the cost. With the advancements in AI in medical science, the deep learning models are designed to obtain the information from patients, parsing the user history and to predict the causes of illness, and the medication treatment to address the illness. There are chatbots available that collect AI-based symptoms and a cure checker that uses algorithms to diagnose and treat illness. These virtual agents collect user information and accordingly suggest a medical therapy to overcome an illness.

New deep learning medical tools that streamline various diagnoses are based on deployment fields. Several deep learning platforms analyze unstructured medical data (radiology images, blood tests, EKGs, patient medical history) to give doctors better insight into a patient's real-time needs. With enablement of next generation AI technology, cognitive healthcare domain is extended for AI-based medical logistics and the healthcare supply chain as well.

Embodiments herein recognize that 5G technology can serve as a rich enabler to push the dependent technologies to even much higher levels through mobility bandwidth of 1 GBPS and convergence of IoT device access, etc. One of the key features of 5G is the network itself being intelligent and cognitive.

Embodiments herein recognize that 5G New Radio (NR) can improve performance by providing large bandwidths for precise timing, new frequency bands at mm-wave, massive MIMO for accurate angle of arrival estimation, and new architectural options supporting especially positioning. Enhancements in the 5G devices positioning can provide precise user location that offers strength for location specific application development and location driven analytics. One of the emerging components of location driven analytics could be healthcare logistics which is addressed by embodiments herein.

Embodiments herein recognize that communicable or infectious illness are caused by microorganisms such as bacteria, viruses, parasites, and fungi that can be spread directly or indirectly from one person to another. Some are transmitted through bites from insects while others are caused by contacting infected people. These viruses often transit person to person based on the nature of transmission. These communicable illness like COVID-19 spread by contact, hence the best way is to isolate and social distancing from suspicious people. In certain communicable illness (like COVID-19), the infection spreads beyond expectations that result in crises like the Novel Coronavirus illness pandemic. In such epidemic situations, stronger medical and healthcare support play an important role to protect and cure the patients along with controlling infection transmission to other people.

Embodiments herein recognize that according to existing approaches, there is no way by which healthcare medical logistics can be planned using the information about the amount of infected people and suspicious people and accordingly provision the medical treatment resources and equipment to the respective regions. During a pandemic situation, there are mechanisms that maintain the records of infected people by their region, but that is primitive evidence and can be achieved during pandemic situations only.

Embodiments herein recognize that there is no way today by which medical treatment resources, e.g. medicines, equipment, and other resources can be provisioned based on the dynamically identified suspicious people in a region. Embodiments herein recognize that with existing approaches, there is no way by which the information from a user can be gathered indicating status about a contagious illness (like infected or suspicious) and accordingly the logistics can be provisioned. The medical records of users can be used based on the consent agreement of a user, but there is no way today by which the data can be used to infer the provisioning of medical treatment resources, e.g., medicine and other medical equipment. For example, if there are five people infected in a part of city and as the illness is contagious, there are 1000+ other people who were in contact with these infected people in last few days and hence, they are suspicious people who were exposed to the infection. However, other parts of a region also have five positive infection cases and 200 suspicious people who have in contact with the infected people. 5G medical service invention disclosure generates the information about suspicious people after user consent. Embodiments herein recognize that there are unequal distribution of infected users and the suspects, there is no way today by which a medical logistics service can obtain this information and accordingly provision the medical treatment resources proactively to respective affected regions.

Embodiments herein recognize that during massive infection and emergency situations, there is a shortage of medicines and medication capabilities including equipment, hence there is a stronger need for an intelligent supply mechanism based on anticipating the requirement per unit in a region.

Embodiments herein provide a method, system, and apparatus that will in a service orchestration layer of a 5G telecom network communicate with other services in a multi-domain programmability framework to collect the information from various sources to get the DTCH list of infected people and suspicious people and accordingly trigger the medical facility logistics management system to provision the medical treatment resources to respective regions.

The invention instance running in the service orchestration layer of a 5G network initiates and collects the information from the medical service in the 5G multi-domain layer and communicates with the service to get the DTCH_LIST of infected and suspicious person. The medical service for infection and trajectory management has information about the UUIDs of user devices that are infected and other devices that were in contact with the exposed people and infected people.

The service instance in a 5G network initiates a handshake with these services with a multi-level hierarchical suspicion finder in the plane and performs inter-service authentications to get the desired information. Once the service is authenticated and user consent is validated, then the service receives the DTCH_IDs of infected people and exposed people. This DTCH_LIST can be provided by a list of 5G logical channels created between UE device and eNodeB. The DTCH_LIST can be provided as Virtual Network Function of a 5G network. These logical channels can be creates by UE devices and/or base stations to send-receive the information over the Radio Bearer (NR) and a VNF can keep track of these DTCHs which have been assigned to the various devices.

Once the DTCH_LIST is received, the map-based classifiers are invoked to get the geo-location latitude, longitude coordinate and height information of the DTCH. 5G virtual network function is invoked which has a built-in capability to locate the DTCH based on the GPS and other 5G-based precise location algorithms. The DTCH locations can be tracked to get their regions of operations. These regions of operation for all the DTCH in DTCH_LIST can be collected and saved into metadata mapper objects of 5G which then can be used to compute medical treatment resource requirements. Once the location and operational region is gathered using map-based classifiers, information aggregators can provide counts of people that are determined to need medical treatment resources, e.g., medical help and medicines and other medical treatment resources for addressing the spreading of illness.

The intensity of the infection and suspect list can be calculated based on suspicious DTCH_IDs in a received DTCH_LIST. Depending on the intensity of the illness and spreading probability (articulated using suspicious people DTCH set), medical treatment resources such as the medical equipment and other facility quantities will be determined by tracing the medical database of illness. For example, if a COVID-19 infected person requires 14 OSELTAMIVIR® (antiviral medication—TAMIFLU®) tablets, then accordingly, if the region contains 1000 suspected people, then 1000*14 tablets can be provisioned for that region. This information can be generated by classifying the medical illness database that comprises maps of illnesses and provisioned medical treatment resources for addressing an illness.

Once this this information is known, a notification can be generated to medical facility services in a region and the respective medical treatment resources requirements being provisioned to address the illness. This notification will be consumed by subscribed medical services in a 5G plane that may further extend notification to service providers to fulfill the medical necessities. The notification can get extended to subscribed service providers.

As a medical facility in a region is proactively provisioned with appropriate medical treatment resources by service orchestration layer 2000, infected users need not be required to exit the region for obtaining required medicines and/or other medical treatment resources which in turn helps build isolation as infected users are not required to move across the zones. The medicines and other resources will be proactively available before the people are actually infected. Resource provisioning is functioned based on infected users and the suspicious users having an assigned probability of being infected; hence, they can obtain medicines or other medical treatment resources easily when needed.

Embodiments herein make use of 5G technology including the providing of logical channels in a wireless network. The Virtual Network Function (VNF) can abstract a user's name and/or device IDs with logical channel IDs that are created with the users in a user to logical channel association data, e.g. a table. By restricting service orchestration layer 2000 from accessing the user information of the user to logical channel association data, services in an orchestration plane cannot backtrack to obtain personal information of a user like IMSI, TMSI numbers as they are abstracted at VNF functions.

Accordingly, embodiments herein use 5G to prevent unauthorized information access. Further, transparent handling of user identity can be achieved because of DTCH-to-UE translation at VNF as provided by the described user to logical channel association data. Further, the 5G telecom network's VNF and PNF contain location-based classification capabilities and user connectivity establishment mechanisms which can be leveraged by computing environment 100. One of the major approaches of computing environment 100 uses DTCH which is logical slicing of a physical bearer to send specialized traffic between the entities, tracing of DTCH for eNodeB login patterns, and manifestation of regions which is not possible in 4G or compatible platforms.

Embodiments herein can include a service working in the 5G service orchestration plane communicating with other location based services in a multi-domain cognitive orchestration layer and can include collecting information about dedicated logical channels in a 5G network. Medical health user data can be transmitted using assigned logical channels and can include various medical health data including medical health data indicating whether a user has been infected or data (e.g., path data) indicating whether a user exposed to infection.

Embodiments herein can further comprise a user consent driven location tracing system in a Virtual Network Function of 5G wherein the VNF tracks the DTCH locations based on 5G locating technologies or global positioning system (GPS) and latitude-longitude coordinate information per DTCH. Embodiments herein can further comprise utilization of existing map-based services in 5G-VNF using inbound or out-of-bound protocol implementation. Embodiments herein can further comprise invocation of a 5G-based infection tracking system to obtain the list of assigned DTCHs which can include such medical health data as medical health data indicating whether a user has been infected or exposed to the illness. Embodiments herein can provide a user-access policy driven authentication mechanism that allows access to user location tracking and a metadata map recording performed in the 5G VNF layer. Embodiments herein can provide sending the multi-level hierarchical DTCH list of infected and suspected UE devices on authentication with the medical mappers. Embodiments herein comprise a collection of lists of the DTCH, extract the DTCH_LIST, and bifurcate the list based on primary, secondary, and subsequent level of infection exposure. Embodiments herein can include a metadata mapper update for the DTCH_LIST collected and use these mapper objects for next level insight articulation. Embodiments herein can provide triggering of DTCH location monitoring for selected DTCH in DTCH_LIST. Embodiments herein can comprise VNF level monitoring of DTCH_IDs and identification of access location eNodeB regions. Embodiments herein can comprise aggregation of eNodeB Radio resource maps (Access reservation at eNodeB) of all the DTCH in the list to obtain the region of a user DTCH. Embodiments herein can comprise application of map-based classification of eNodeB access pattern maps and can generate user operation region information. Embodiments herein can compute total elements in the pre-defined region map and count multi-level infected and exposed people in the region. Embodiments herein can invoke medical classifiers to provide the infection information and medication treatment details and gather the medication policy requirement to address the patients. Embodiments herein can further notify a medical facility with information of provisioned medical treatment resources including requirements of related medication and information of provisioned resources to other medical facilities based on region. Provisioning of medical treatment resources to a medical facility can include automated distribution of medical treatment resources to a medical facility, e.g., by automated placement of a delivery order to an enterprise owned or external vehicle courier service, or by initiation of automated, e.g., robotic medical resource stocking of an autonomous vehicle, and initiation of route travel to a destination by the autonomous vehicle. Embodiments herein can comprise sending out the notification of requirement to subscribed medical service providers. Embodiments herein can comprise generation of user notification regarding medical facility services to manage the logistics. Embodiments herein can articulate the suspected people in the region and compute their medication and other medical treatment resource requirement and accordingly can perform proactive notification so that the emergency situations can be handled with efficiency. Embodiments herein can proactively identify medical treatment resource requirements for addressing a communicable illness during a pandemic situation and accordingly can update related people to fill gaps. Embodiments herein can provide critical function during pandemic situations wherein the medicines and other medical treatment resources for addressing an illness can have have limited availability. Embodiments herein can improve responsiveness of medical facilities where equal distribution of medical treatment resources to different medical facilities does not address the needs of the different medical facilities during medical emergency, like COVID-19. Embodiments herein offer a mechanism by which the prediction of medicine and other medical treatment resource usage and other interrelated facility utilization can be performed that helps proactive medical treatment resource reservation. Embodiments herein provide a suspected user list and accordingly manifest the medical requirements that helps getting proper treatment to infected users and suspected users who have been assigned a probability of having been infected. Embodiments herein provide a service does not specify an infected people list or any other user information as it directly pushes the information over medical channel using VNF. Hence, there is no personal information threat. Embodiments herein provide a time parameter for which infected users and other users are spending together and selects the distribution of provisioned medical treatment resources accordingly. Embodiments herein can provide a logistics advisory to the related subscribed users for timely supply of medical treatment resources to address an illness.

Embodiments herein can use 5G infrastructure for autonomous vehicle domain. Embodiments herein work for VNF calls for dynamic changing of user based 5G-DTCH based on the medical history and related anticipation in mobility. Embodiments herein enable IaaS/PaaS service providers to provide more accurate and optimal real-time data placement using 5G service orchestration and can provide ability to push the data based on the realistic situations by self-adjusting the monitoring levels based on real-time information utilization, etc.

According to one example, embodiments herein can include (1) The Service orchestration layer of 5G network initiates and invokes MEDICA_SERVICE interconnect APIs over 5G in-Band protocol frames; (2) Data collector daemons can be invoked to receive the stream from medical service and other interrelated 5G multi-domain services; (3) DTCH_COLLECTOR sends an ASYNC communicates to multi-level hierarchical infection detector service to gather the DTCH_LIST of infected and suspicious person; (4) The information can be processed at peer service in the domain and trajectory management is invoked to gather the list of IDs; (5) The service gathers allowed UUIDs of user devices that are infected and other devices that were in contact with the exposed people and infected people; (6) Handshake COMM is plagued with these services multi-level hierarchical suspicion finder in the plane; (7) Inter-service UUID and DTCH authentications is triggered with 5G programmability framework and User-Plane (UP) authentication services; (8) Stream receivers and metadata mappers are invoked that receives the DTCH_IDs of infected and exposed people UE (The DTCH_LIST is a list of 5G logical channels created between UE→eNodeB→Virtual Network Functions→Radio Bearer (NR)); (9) Once the DTCH_LIST is received, the map-based classifiers are invoked to obtain the geo-location Lat-long information of the DTCH; (10) VNF instance of DTCH locator is injected that traces the device and returns respective eNodeB; (11) Frequency based eNodeB filtering is performed for each eNodeB in DTCH-LIST received to obtain region location; (12) Once the location and operational region is gathered using map based classifiers, information aggregators give the counts of people that probably need medical help and medicines for the spreading illness; (13) The intensity computations are raised with DTCH_LIST; (14) Intensity of the illness and spreading probability (articulated using suspicious people DTCH set), the medical equipment and other facility quantity will be determined by tracing medical database of illness (the information can be generated by classifying the medical illness database comprising illness-medication mappers); (15) In-band message over PLMQ will be sent to Notification manager with <area, medical logistics requirement> tuple; (16) This notification may optionally consume by subscribed medical services in 5G plane that may further extend notification to service; (17) Optionally, notification can be issued to subscribed users via 5G's in-built VNF-DTCH translation logic.

Certain embodiments herein may offer various technical computing advantages involving computing advantages to address problems arising in the realm of computer networks and computer systems. Embodiments herein can provide secure delivery of user data such as sensitive medical health user data. For delivery of the medical health user data, a virtual network function (VNF) layer can be configured to includer user to logical channel association data that facilitates participation of UE devices within a wireless network.

Figure 10:
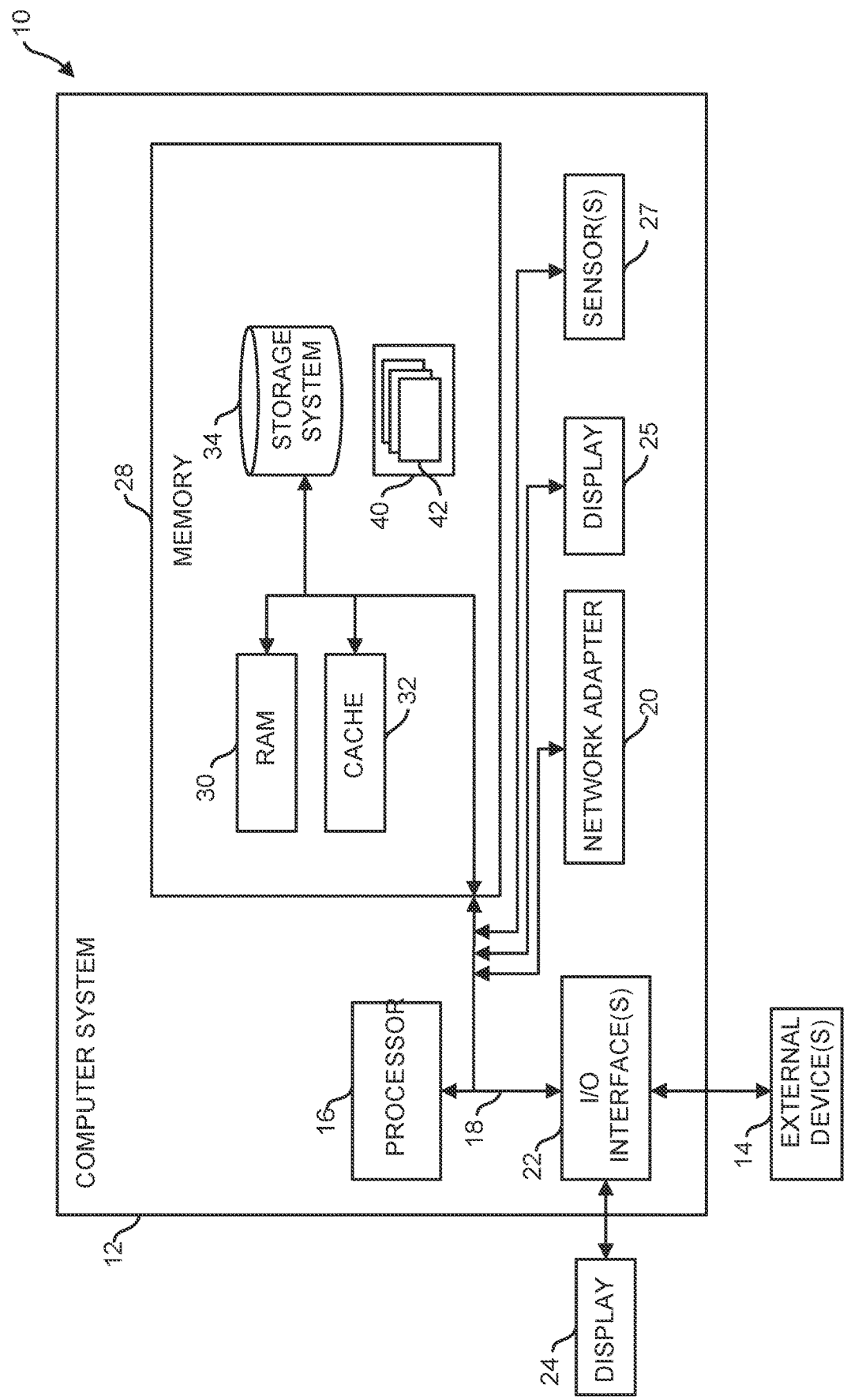
FIG. 10 depicts a computing node according to one embodiment.
Figure 11:
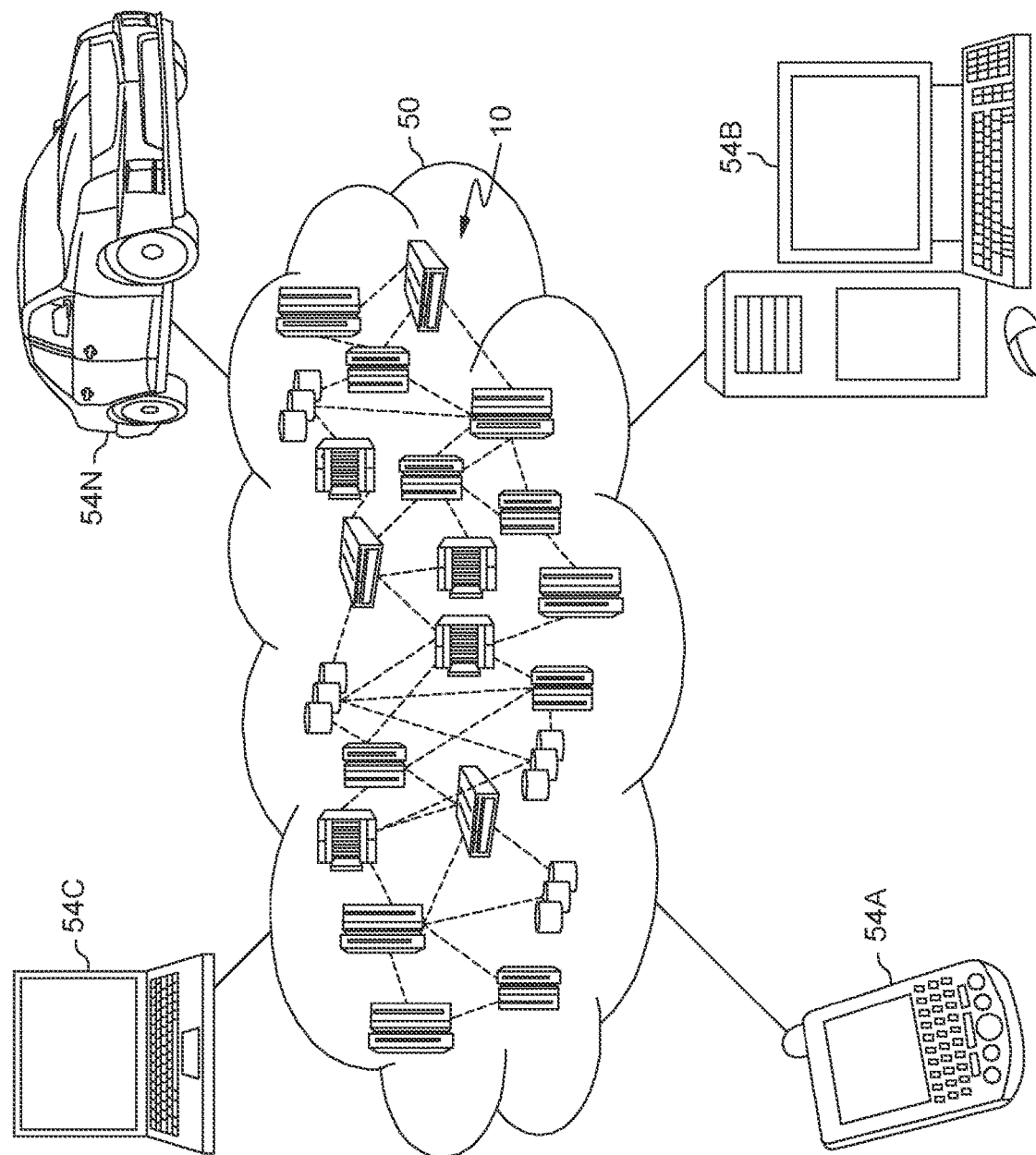
FIG. 11 depicts a cloud computing environment according to one embodiment.
Figure 12:
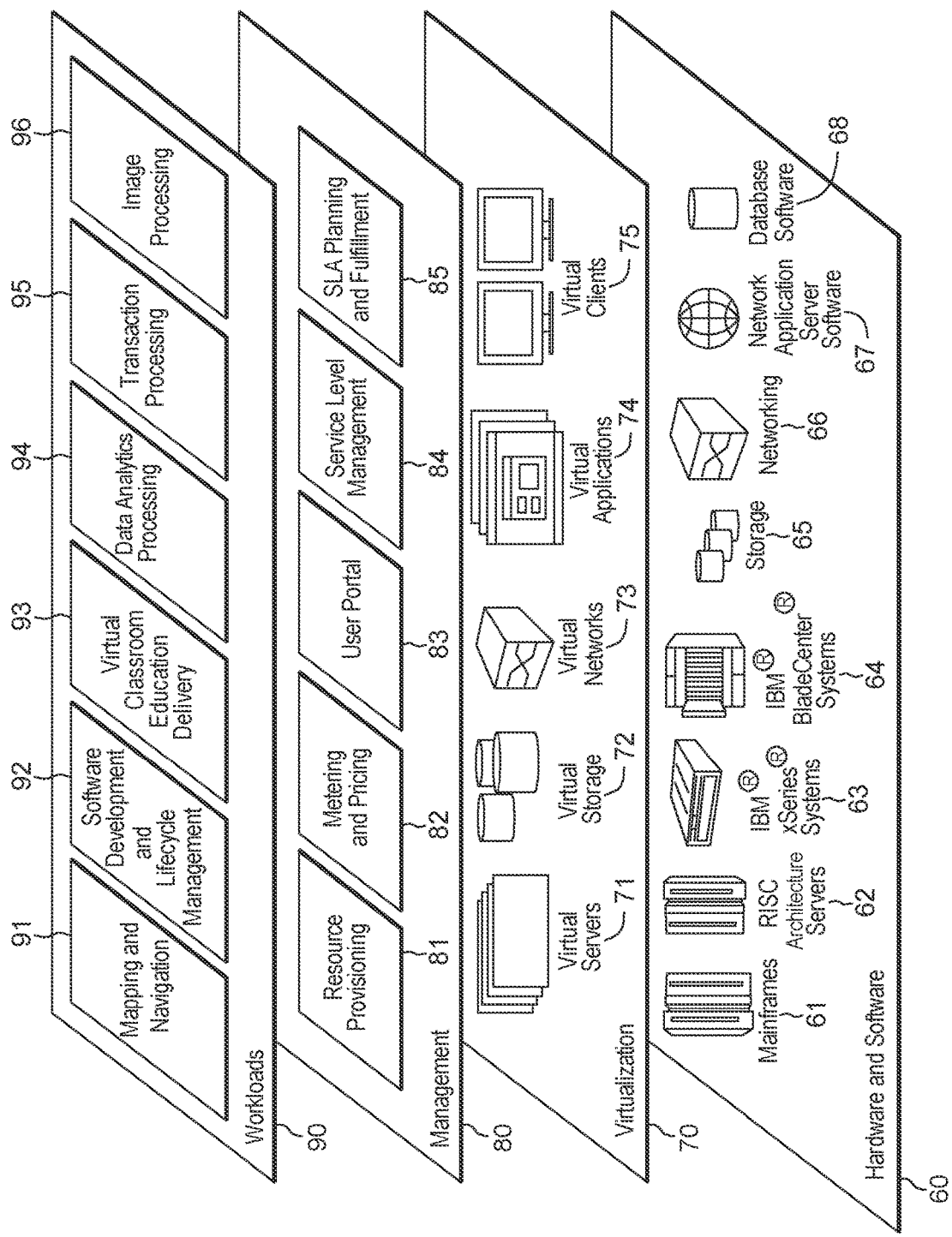
FIG. 12 depicts abstraction model layers according to one embodiment.

In a wireless network a VNF layer can assign logical channels, e.g., 5G New Radio (NR) DHTC channels to respective UE devices associated to various users. On receipt of user data by a VNF layer, the VNF layer can pass the user data to a service orchestration layer for further processing. In the service orchestration layer user data can be associated to logical channels, which serve as generical references to users. However, the service orchestration layer can be restricted from accessing user identifying data of the user to logical channel association data. In the service orchestration layer, there can be assigned to users having a current status of uninfected, a probability of being infected. Historical location data of user can be used for assignment of infection probabilities to various users. Infection addressing provisioning medical treatment resources can be assigned in dependence on the assigned infection probabilities. Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 10-12 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 10, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 11-12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, UE devices 110A-110Z can include one or more computing node 10 and can include one or more program 40 for performing functions described with reference to UE devices 110A-110Z. In one embodiment, base stations 120A-120Z can include one or more computing node 10 and can include one or more program 40 for performing functions described with reference to base stations 120A-120Z. In one embodiment, orchestrator 130 can include one or more computing node 10 and can include one or more program 40 for performing functions described with reference to orchestrator 130. In one embodiment VNF layer 1000 can be performed using one or more computing node 10, and can be defined by one or more program 40 for performing functions described with reference to VNF layer 1000. In one embodiment VNF layer 2000 can be performed using one or more computing node 10, and can be defined by one or more program 40 for performing functions described with reference to VNF layer 2000.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/

Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 11 computing node 10 is described as being implemented in a cloud computing environment and accordingly is referred to as a cloud computing node in the context of FIG. 11.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for delivery of user data as set forth herein. The processing components 96 can be implemented with use of one or more program 40 described in FIG. 10.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
obtaining user data from respective ones of a plurality of UE devices by a virtual network function (VNF) layer which VNF layer has assigned logical channels to respective ones of the UE devices for wireless transmission of the user data, wherein the VNF layer maintains user identifying data;
examining, by a service orchestration layer that runs on top of the VNF layer, data of the user data, wherein the service orchestration layer is configured so that the service orchestration layer is restricted from accessing the user identifying data with use of association data that associates the logical channels to users of the UE devices; and
performing processing in dependence on the examining.

2. The computer implemented method of claim 1,
wherein the user data comprises medical health user data, wherein the virtual network function (VNF) layer maintains user to logical channel association data associating user identifying data to logical channels assigned to users identified by the user identifying data,
and wherein the service orchestration layer is configured so that the service orchestration layer is restricted from accessing the user identifying data of the user to logical channel association data.

3. The computer implemented method of claim 1,
wherein the virtual network function (VNF) layer maintains user to logical channel association data that associates user identifying data to logical channels assigned to respective ones of the UE devices.

4. The computer implemented method of claim 1,
wherein the association data that associates the logical channels to users of the UE devices is defined based on logical channel association data that associates user identifying data to logical channels assigned to users identified by the user identifying data,
and wherein the association data excludes user identifying data present in the logical channel association data.

5. The computer implemented method of claim 1,
wherein the logical channel association data is stored at the virtual network function layer,
and the association data that associates logical channels to users of the UE devices is separately stored at the service orchestration layer in a restricted format that omits user identifying data, wherein the service orchestration layer is configured to reference the restricted association data during processing.

6. The computer implemented method of claim 1,
wherein the user data obtained from the UE devices is tagged with a logical channel identifier that functions as a surrogate user reference,
and wherein the service orchestration layer processes the tagged user data using the logical channel identifier without accessing any associated user identifying data.

7. The computer implemented method of claim 1,
wherein the service orchestration layer enforces a policy restricting access to user identifying data maintained by the virtual network function layer,
and wherein operations performed by the service orchestration layer are permitted using logical channel identifiers and denied when requesting access to user identifying information.

8. The computer implemented method of claim 1,
wherein the association data that associates logical channels to users of the UE devices is derived from user to logical channel association data that includes device identifiers and assigned logical channel identifiers,
wherein the association data excludes device identifiers and is generated by performing a transformation that includes parsing a logical channel association table maintained by the virtual network function (VNF) layer, removing or masking user-identifying fields from the parsed data, and generating a transformed surrogate mapping data structure,
and wherein the service orchestration layer accesses the surrogate mapping data structure for processing operations while being configured to ignore, reject, or fail any access attempt to fields not explicitly included in the surrogate mapping.

9. The computer implemented method of claim 1,
wherein the virtual network function layer maintains a table comprising mappings between respective UE device identifiers and assigned logical channel identifiers and is further configured to provide to the service orchestration layer, in response to a request for association data, a filtered data set in which user-identifying information is removed, redacted, or substituted with non-identifying surrogate references,
and wherein the service orchestration layer executes data analytics functions that use logical channel identifiers as primary keys for indexing, querying, and aggregating user data records, without access to any corresponding user identifier.

10. The computer implemented method of claim 1,
wherein the association data accessed by the service orchestration layer comprises a reduced information representation of a logical channel association dataset maintained in complete form at the virtual network function layer,
wherein the reduced information representation is generated by an automated data curation process configured to detect and exclude fields classified as personally identifying based on a predefined classification rule set,
and wherein the service orchestration layer is prevented from reconstructing user identity from the association data due to both an exclusion of user-identifying fields and absence of access privileges to the logical channel association dataset maintained in complete form at the virtual network function layer.

11. The computer implemented method of claim 1,
wherein the service orchestration layer is deployed within a distributed computing environment that is logically and physically isolated from the virtual network function layer by one or more data abstraction or enforcement mechanisms,
wherein the service orchestration layer accesses a replica of the association data that maps logical channels to users in which user-identifying attributes are substituted with hashed or pseudonymized identifiers,
and wherein attempts to join user data across layers using the association data are constrained to one-way resolution paths that prevent reverse-mapping to user-identifying data maintained by the virtual network function layer.

12. A system comprising:
a memory;
at least one processor in communication with the memory; and
program instructions executable by one or more processor via the memory to perform a method comprising:
obtaining user medical health data from respective ones of a plurality of UE devices by a virtual network function (VNF) layer which VNF layer has assigned logical channels to respective ones of the UE devices for wireless transmission of the user data, wherein the VNF layer maintains user to logical channel association data associating user identifying data to logical channels assigned to users identified by the user identifying data;
examining, by a service orchestration layer that runs on top of the VNF layer, medical health data of the user medical health data, wherein the service orchestration layer is configured so that the service orchestration layer is restricted from accessing the user identifying data of the user to logical channel association data with use of association data that associates the logical channels to users of the UE devices; and
performing processing in dependence on the examining.

13. The system of claim 12, wherein the method includes receiving a permission from a certain user, wherein the permission is absent a permission that permits the service orchestration layer to access user identifying data of the certain user.

14. The system of claim 12, wherein the examining, by the service orchestration layer that runs on top of the VNF layer, medical health data of the user medical health data, includes medical health data that specifies an infection state (infected or not infected) of a set of users, and a trajectory of the set of users over time, wherein the method includes provisioning a geographical region with medical treatment resources to address an infection in dependence on the infection state (infected or not infected) of the set of users, and locations of the set of users over time, wherein the method includes predicting crossings of users of the set of users in dependence on the locations of the set of users over time, and identifying suspected infected users in dependence on the predicting.

15. A computer implemented method comprising:
obtaining medical health user data from respective ones of a plurality of UE devices by a virtual network function (VNF) layer which VNF layer has assigned logical channels to respective ones of the UE devices for wireless transmission of the user data, wherein the VNF layer maintains user to logical channel association data associating user identifying data to logical channels assigned to users identified by the user identifying data;
examining, by a service orchestration layer that runs on top of the VNF layer, medical health data of the user medical health data, wherein the service orchestration layer is configured so that the service orchestration layer is restricted from accessing the user identifying data of the user to logical channel association data with use of association data that associates the logical channels to users of the UE devices; and
performing processing in dependence on the examining.

16. The computer implemented method of claim 15, wherein the association data associates logical channels to UE device identifiers of the UE devices.

17. The computer implemented method of claim 15, wherein the association data associates 5G dedicated traffic channels (DTCH) to UE device identifiers of the UE devices.

18. The computer implemented method of claim 15, wherein the association data is restricted from access by the service orchestration layer.

19. The computer implemented method of claim 15, wherein the association data is restricted from access by the service orchestration layer, and wherein the service orchestration layer, by the association data being restricted from access by the service orchestration layer, is configured to process user data of a certain user without accessing user identifying data of the certain user.

20. The computer implemented method of claim 15, wherein the association data associates 5G dedicated traffic channels (DTCH) to UE device identifiers of the UE devices, wherein the association data is maintained by the VNF layer and is restricted from access by the service orchestration layer, and wherein the service orchestration layer, by the association data being restricted from access by the service orchestration layer, is configured to process user data of a certain user associated to a certain UE device of the UE devices without accessing user identifying data of the certain user, and wherein the VNF layer distributes relevant portions of the association data to respective ones of base stations and the UE devices for facilitating communications between the respective ones of base stations and the UE devices.

* * * * *